United States Patent
Terme

(10) Patent No.: US 6,508,401 B1
(45) Date of Patent: Jan. 21, 2003

(54) AEROSPATIALE MATRA AIRBUS

(75) Inventor: Jean-Louis Terme, Plaisance du Touch (FR)

(73) Assignee: Aerospatiale Matra Airbus, Paris (FR)

( * ) Notice: Subject to any disclaimer, the term of this patent is extended or adjusted under 35 U.S.C. 154(b) by 0 days.

(21) Appl. No.: 09/515,922

(22) Filed: Mar. 1, 2000

(30) Foreign Application Priority Data

Mar. 2, 1999 (FR) .............................................. 99 02546

(51) Int. Cl.$^7$ .......................... G06F 17/60; G06F 17/00; G06K 5/00; G06K 15/00
(52) U.S. Cl. ........................ 235/385; 235/375; 235/380; 235/383
(58) Field of Search ................................. 235/383, 385, 235/375, 380; 364/478; 700/225; 340/572, 825

(56) References Cited

U.S. PATENT DOCUMENTS

| | | |
|---|---|---|
| 5,214,409 A | 5/1993 | Beigel |
| 5,469,363 A | 11/1995 | Saliga |
| 5,610,596 A | 3/1997 | Petitclerc |
| 5,850,187 A * | 12/1998 | Carrender et al. ....... 340/10.42 |
| 5,920,287 A * | 7/1999 | Belcher et al. ............. 342/450 |
| 6,128,549 A * | 10/2000 | Swartz et al. .................. 342/51 |

FOREIGN PATENT DOCUMENTS

| | | |
|---|---|---|
| GB | 2284728 | 6/1995 |
| GB | 2286948 | 8/1995 |

* cited by examiner

Primary Examiner—Thien M. Le
Assistant Examiner—April Nowlin
(74) Attorney, Agent, or Firm—Stevens, Davis, Miller & Mosher, LLP

(57) ABSTRACT

The present invention relates to a device for aiding the identification of subassemblies of an item of equipment (E) including a number of subassemblies and equipped with a storage unit (US) storing references.

According to the invention, said device includes a memory (7) recording the references stored in the storage unit (US), an external electrical power supply means (9) for the memory (7), a means (13) of isolation both electrically and in terms of software processing, and a connection means (10) connected to the memory (7) and to which can be connected a reader (L) capable of reading and telling back the references which are recorded in the memory (7) and which relate to said subassemblies of the item of equipment (E).

11 Claims, 1 Drawing Sheet

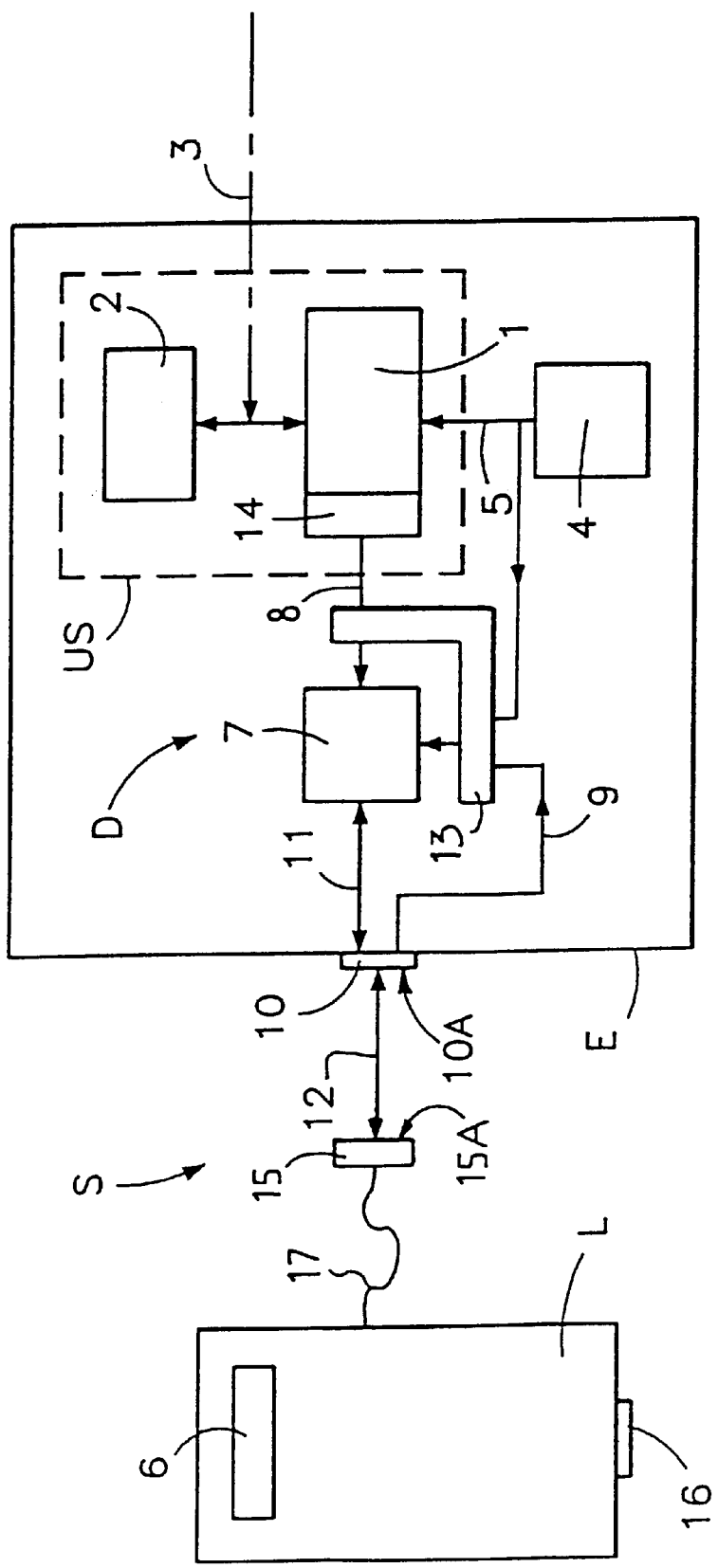

AEROSPATIALE MATRA AIRBUS

The present invention relates to a device for aiding the identification of subassemblies of an item of equipment and to a system for performing identification using such a device.

More specifically, the present invention applies to an item of equipment which includes a number of subassemblies, particularly hardware and software subassemblies, and which is equipped with a storage unit which, among other things, stores the references of said subassemblies and can be loaded remotely.

Although not exclusively, the invention more particularly applies to an item of equipment of an aircraft, particularly a commercial transport airplane.

It will be noted that, when an item of equipment of this kind is installed in an aircraft and supplied with electric current, it is generally possible to identify the subassemblies of said item of equipment using appropriate maintenance terminals on board the aircraft.

However, such identification is no longer possible, especially when:
- the item of equipment is not powered with electricity on the aircraft;
- the aircraft does not have such maintenance terminals; or
- the equipment is not mounted on an aircraft but is, for example, on a rack in an equipment storage room.

It will be noted that this last situation is the most unfavorable as far as identification is concerned because in general, in such a case:
- the item of equipment is not powered with electricity;
- there is a high number of different items of equipment; and
- those involved are often not very highly qualified in the matter of electrical or software operations.

Furthermore, the usual means for performing identification, especially encoder wheels and displays, cannot be applied in this particular instance.

This is because:
- as far as known encoder wheels are concerned, there is an especial problem of space on the visible face of the equipment item and a problem of controlling the information; and
- as far as known displays are concerned, for example displays of the electroluminescent type, there are particular problems of space, high cost, reliability, and high electricity consumption.

Further, document U.S. Pat. No. 5,469,363 discloses a checking system which includes an electronic means (tag) associated with an aircraft equipment item. This electronic means comprises an EEPROM in which are stored data relating, in particular, to successive events. These data may be transmitted to a computer via an interface unit of an interrogator. Said electronic means comprises no internal source of electrical power. It is powered from the outside, via an inductive coupling circuit.

What is more, document GB-2, 286 948 discloses an electronic identification means which is incorporated into an item of electronic equipment, such as a personal computer or mobile telephone. This identification means includes, in an EEPROM, an identification code which can be changed and which can be read by a reader external to the equipment item. For this purpose, said reader transmits electric current to said identification means, via an inductive coupling.

This known identification means only allows said equipment item to be identified. It does not allow a number of subassemblies of said equipment item to be identified simultaneously.

The object of the present invention is to overcome the aforementioned drawbacks. The present invention relates to a simple, effective and very low-cost device which is able to afford assistance with identifying subassemblies in an item of equipment, particularly items of equipment of an aircraft.

To this end, according to the invention, said identification aid device for an item of equipment which is equipped with a storage unit storing references and capable of being loaded remotely, said device including:
- an identification memory connected to said storage unit and recording said references, stored in said storage unit;
- an external electrical power supply means for said identification memory; and
- a connection means connected to said identification memory and to which can be connected a reader capable of reading and telling back the references recorded in said identification memory, is noteworthy in that it is formed in such a way as to identify subassemblies of said item of equipment, in that said references relate to said subassemblies, and in that it additionally includes an isolation means intended:
- on the one hand, to electrically isolate said identification memory from said subassemblies and from said storage unit; and
- on the other hand, to isolate said identification memory in terms of processing software from said subassemblies and from said storage unit.

Thus, by virtue of the invention, a number of subassemblies of the item of equipment may be identified simultaneously. This identification is performed:
- simply, by connecting a reader, and
- inexpensively, because of the low cost of the components of said device.

What is more, the present invention allows perfect control of the information, especially by:
- limiting the duplication of information (references of the subassemblies) between the storage unit and the identification memory to a strict minimum;
- guaranteeing the consistency between information items where these are duplicated; and
- guaranteeing that the information is automatically updated whenever additional information is remotely loaded.

It will also be noted that:
- by virtue of the electrical isolation, only a minimal part of the device needed for reading the information from the identification memory is powered; and that
- by virtue of the isolation in terms of software processing, any deliberate or otherwise alteration of the remainder of the item of equipment by use of the link to the identification memory is prevented.

Advantageously, said isolation means is a relay which is preferably controlled by an electrical source of said equipment item.

Furthermore, advantageously, said electrical power supply means is an electrical link which can be connected to an electrical source external to the item of equipment and independent of said device.

According to the invention, the link between the storage unit and the identification memory is advantageously intended to transmit:
- either signals of a serial type which are created using a known serial/parallel converter;
- or signals of a serial type which are created using known software processing within the storage unit.

It will also be noted that said connection means may be produced in different ways.

Specifically, in a first preferred and particularly advantageous embodiment, it includes at least one contact zone capable of being placed in contact with at least one collaborating zone of the reader, while within a second embodiment it includes an emitter of electromagnetic waves which can collaborate with a sensor arranged on the reader.

The present invention also relates to a system for identifying the subassemblies of such an item of equipment.

According to the invention, said system is noteworthy in that it includes:

an identification aid device like the aforementioned one; and a reader which can be connected to the connection means of said identification aid device, can then read the references recorded in the identification memory of said device and tell them back.

Thus, by virtue of the invention, it is possible to use a single reader to identify a number of equipment items each equipped with an identification aid device according to the invention. In consequence, as this reader is the most expensive part of said system, this allows the cost of the latter to be reduced considerably.

Advantageously, the electrical source intended to power the identification memory is incorporated into the reader, which makes it possible to considerably reduce the electrical consumption needed for implementing the present invention, because the identification memory is only powered when the reader is connected with a view to identifying the subassemblies.

As a preference, said reader is capable of storing the references read and of telling them back later, for example by connecting said reader to a processing station intended to perform various processing operations such as, for example, equipment stock control, etc.

The single figure of the appended drawing will make it easy to understand how the invention may be embodied. This figure depicts the block diagram of an identification system according to the invention.

The system S according to the invention and depicted diagrammatically in the figure is intended for identifying subassemblies, not depicted, of an item of equipment E which includes a number of subassemblies and which is equipped with a storage unit US storing the references of said subassemblies.

Said item of equipment E may, in particular, be an item of aircraft equipment that can be replaced without any special precautions, for example on a stopover, or an independent module of such an item of aircraft equipment.

In the known way, said storage unit US arranged on the item of equipment E:

includes a microprocessor 1 and a non-volatile memory 2 connected to said microprocessor 1;

can be loaded remotely, as illustrated by a link 3 in chain line, particularly with the references of said subassemblies; and can be powered by an electrical source 4, via a link 5.

It will also be noted that:

in general, such an item of aircraft equipment E includes almost a dozen different subassemblies; and each reference is identified by about a dozen characters, which leads to a high number of characters per equipment item to be consulted during identification.

Hence, to allow easy, quick and low-cost identification of said subassemblies, that is to say to allow the references thereof to be read, particularly when the item of equipment E is not powered with electricity, the system S according to the invention includes:

a device D arranged on the item of equipment E and specified hereinbelow; and a reader L which can be connected to said device D so that the references of said subassemblies can then be read from a display screen 6 of said reader L.

For this purpose, said device D according to the invention includes:

an identification memory 7 connected to the microprocessor 1 of said storage unit US and automatically recording the references of said subassemblies, these references being stored in said storage unit US, particularly those stored during any remote loading operation;

an external electrical power supply means 9 for said identification memory 7; and a connection means 10 connected to said identification memory 7 by a two-way link 11, and to which can be connected, as illustrated by a link 12, said reader L which is capable of reading and telling back the references recorded in said identification memory 7.

Said electrical power supply means 9 is a simple electrical link which is connected, upon connection of the reader L to the device D, to an electrical power supply source, for example an electric battery, incorporated into said reader L.

Thus, only the identification memory 7 is electrically powered from the outside during identification, this requiring an extremely low electrical consumption for implementing the invention.

Said means 9 is electrically isolated by an isolation means 13, preferably a relay controlled by the electrical source 4, which:

on the one hand, electrically insulates the inside of the item of equipment E from the outside, to restrict the power supply to only those internal elements which are needed for implementing the invention, that is to say the identification memory 7 and the associated electronics; and on the other hand, isolates the identification memory 7 in terms of processing software from the rest of the item of equipment, by breaking the link 8 between said identification memory 7 and the storage unit US.

According to the invention, the link 8 between the identification memory 7 and the storage unit US is made using a serial communications bus.

As a preference, a bus known by the name of an I²C (inter integrated circuits) bus is used for this, this bus, in the known way, using just three wires and allowing any two items of equipment to exchange data at a bit rate which may be as high as 100 kilobits per second. An automatic synchronization procedure also allows dialogue between subscribers that are not operating at the same speed (the fastest is slowed down to operate at the speed of the slowest).

The simplicity of this known bus makes it possible to reduce the amount of wiring needed, thus improving reliability and reducing cost.

This two-way serial bus includes two signal wires (one data line and one clock line) and a common ground wire, and its use is widespread in the broad consumer electronics industry.

In this case, the identification memory 7 is associated with an appropriate interface 14 which allows the microprocessor 1 to access said identification memory 7, both for reading and for writing. The microprocessor 1 automatically updates the memory 7, when it is remotely loaded, via this interface 14.

According to the invention, the connecting of the interface 14 to the microprocessor may be performed, as is known, in two different ways:

- on the one hand, electronically, using an interface component between the communication bus used and a parallel bus; and
- on the other hand, in terms of software, using two input and output pins of a two-way port of the microprocessor 1 and performing serial conversion using appropriate software.

Furthermore, by way of a reader L, it is possible to use either a commercially available microcontroller including an appropriate interface or a personal computer of the pocket type, with which an appropriate interface is combined.

Furthermore, the connection between the reader L and the connection means 10 may be obtained by making a direct contact between a contact surface 15A of a connection element 15 which is connected by a flexible wire link 17 to the reader L and a collaborating contact surface 10A of the connection means 10.

More specifically, such a contact may be achieved by extending a printed circuit board with lands formed directly on said printed circuit.

Said connection means 10 is preferably arranged on the front face of the item of equipment E, which is accessible during fitting, and this allows the connection to be made even when the item of equipment E is fitted on an aircraft.

Furthermore, said connection means 10 may be protected by a pivoting flap, not depicted.

In the context of the present invention, the link between the reader L and the connection means 10 can also be achieved using a system, not depicted, for emitting and receiving electromagnetic or optical waves. However, it then becomes necessary to provide an electrical power supply on the device D and the cost of operation of the system S is then far greater.

It will be noted that the aforementioned connection must allow:

- a two-strand power supply of the isolation means 13;
- the transmission of bus signals, for example the aforementioned three signals of the I²C bus; and possibly
- the transmission of a return power supply signal to the reader L, so as to automatically power said reader L upon connection and automatically switch it off upon disconnection.

In consequence, by virtue of the invention, the reading (the scrolling across the screen 6) of the references of the subassemblies of the item of equipment E is performed simply by connecting the reader L to the device D. It is possible to provide a two-position button (or two separate keys) for scrolling in the two directions respectively.

Furthermore, said reader L may also be produced in such a way as to store the references read and tell them back later, for example by connecting said reader via a connection element 16 to a processing station, not depicted, intended to perform various processing operations, such as, for example, stock control, etc.

It will be noted that the connection elements 15 and 16 may be combined into a single connection element, not depicted.

What is claimed is:

1. An identification aid device for an item of equipment which is equipped with a storage unit storing references and capable of being loaded remotely, said device including:
   an identification memory for being connected to said storage unit and for recording said references stored in said storage unit;
   an external electrical power supply means for supplying power to said identification memory; and
   a connection means connected to said identification memory and for being connected to a reader for reading and telling back the references recorded in said identification memory, wherein the device is formed in such a way as to identify subassemblies of said item of equipment, wherein said references relate to said subassemblies, and wherein the device further includes an isolation means for:
   electrically isolating said identification memory from said subassemblies and from said storage unit; and
   isolating said identification memory in terms of processing software from said subassemblies and from said storage unit.

2. The device as claimed in claim 1, wherein said isolation means is a relay.

3. The device as claimed in claim 2, wherein said relay is controlled by an electrical source of said item of equipment.

4. The device as claimed in claim 1, wherein said electrical power supply means is an electrical link which can be connected to an electrical source independent of said device.

5. The device as claimed in claim 1, further comprising means for providing a link between the storage unit and the identification memory to transmit signals of a serial type which are created using a serial/parallel converter.

6. The device as claimed in claim 1, further comprising means for providing a link between the storage unit and the identification memory to transmit signals of a serial type which are created using software processing within the storage unit.

7. The device as claimed in claim 1, wherein said connection means includes at least one contact zone for being placed in contact with at least one collaborating zone of the reader.

8. A system for identifying subassemblies of an item of equipment which includes a number of subassemblies and which is equipped with a storage unit storing references of said subassemblies and capable of being loaded remotely, said system comprising:
   an identification aid device as specified in claim 1, which is arranged on said item of equipment; and
   a reader for being connected to the connection means of said identification aid device, to read the references recorded in the identification memory of said identification aid device and tell back the references.

9. The system as claimed in claim 8, wherein said electrical source is incorporated into said reader.

10. The system as claimed in claim 8, wherein said reader includes at least one contact zone for being placed in contact with the contact zone of said connection means.

11. The system as claimed in claim 8, wherein said reader comprises means for storing the references read and of telling back the references later.

* * * * *